3,410,785
VACUUM METALLIZED ELECTRODE

Philip J. Clough, Reading, and Robert W. Steeves, Nahant, Mass., assignors to National Research Corporation, Cambridge, Mass., a corporation of Massachusetts
No Drawing. Filed Aug. 24, 1965, Ser. No. 482,300
2 Claims. (Cl. 204—290)

ABSTRACT OF THE DISCLOSURE

Titanium electrode, for electrochemical systems, with vacuum deposited coat of platinum affording high resistance to flaking upon reversal of electric current in the electrochemical system.

---

The present invention relates to refractory metal electrodes used in electrochemical processes such as nickel plating, electropolishing, chlorination baths and the like. One common form of electrode is a titanium rod with an oxidation preventing coating of a noble metal, e.g., platinum, the platinum is itself applied to the electrode by electroplating. There is an extensive body of prior art built around this field. For instance, U.S. Patent 2,719,797 shows a platinum coated electrode of tantalum or columbium. Platinum coated titanium electrodes are described in U.S. Patents 3,096,272; 3,103,484 and 3,055,811

A significant problem is entailed in the use of these prior art electrodes in electrochemical processes where the electrode is normally reversed in polarity after each cycle of usage for cleansing the electrode itself and/or the coated part of deposits which accumulate during the cycle. The noble metal coating tends to flake off and expose the underlying refractory metal substrate. This reduces the power efficiency and breakdown voltage of the electrode since the exposed portions are rapidly oxidized. Also the anode is soon passivated after flaking starts.

We have found a new form of electrode which avoids

Example 1

A series of ⅜ and ½-inch diameter titanium rods were mounted on a rotating jig in a vacuum chamber. Also mounted in the chamber were a water cooled copper crucible containing platinum and an electron beam heat source. The power input to the electron beam gun was held at 6 to 8 kilowatts (about 17 kilovolts) for all runs and the vacuum level in the chamber was held at the high $10^{-6}$ torr range and better (i.e., lower pressures). The platinum source ran at about 2300° C. throughout. The coating thickness was varied by source to substrate distance and by time of exposure of the substrate to the platinum vapors produced by electron beam heating of the source. For instance, coating at 6 to 7 kilowatts for 30 minutes changed the rod diameters from (on a sample basis) .5111 inch to .5138 inch, i.e.—a .00135 inch coating thickness. A 2 minutes coating run changed the diameters from .5106 inch to .5115 inch, i.e.—a .00045 thickness. Another two minutes run produced a .0005 coating thickness. This was the lower limit of micrometer measurements. Further runs were made to produce coatings less than .000 inch, as determined by visual observation and chemical analysis.

The various samples were evaluated by using each as a cathode in a sodium hydroxide bath (12 ounces per gallon) at a temperature of 180° F. with the other electrode being a nickel sheet. A series of cycles were conducted. In each cycle, the platinum coated titanium held as a cathode for one minute and the current then reversed so that the platinum coated titanium was held as an anode for about 15 seconds.

Currents of 150 amperes per square foot, 300 amperes per square foot and, briefly, 3,000 amperes per square foot were run through the bath (square footage based on electrode surface in the bath). The results of this testing are shown in Table 1 below. In addition to the above samples, the tests included several samples which were heat treated (post-heat-treatment) in vacuum at 800° C. after coating in order to improve the adherence of the coating.

TABLE 1

| Coating Thickness | Post Heat Treatment | Observed Adherence | Electrolytic Test Current, (amps/sq. ft.) | Results |
|---|---|---|---|---|
| Uncoated | | | 150 | No passivation in 10 cycles. |
| Do | | | 300 | Passivated in 10 cycles. |
| About .0005 to .001 inch | None | High [1] | 150 | Flaked quickly. |
| Do | 800° C.[2] | do | 150 | No passivation after 15 cycles; discolored (grey to dark brown). |
| Less than .0001 inch | None | do | 150 | No passivation after 44 cycles. |
| Do | do | do | [3] 3,000 | No passivation; sample maintained same voltage/current characteristics. |
| Do | 800° C | do | 150 | No passivation after 44 cycles. |

[1] As indicated by scraping the coating with a knife.
[2] In vacuum (about ½ hr.)
[3] For 2 cycles; then 300.

the prior art problem of flaking and provides a substantial improvement in the efficiency and cost of electrochemical processes using our electrodes. Our new electrode consists, in a preferred embodiment, of a titanium substrate with a vacuum deposited coating of a noble metal in a thickness of less than .0001 inch. The vacuum deposited metal coating is characterized by uniformity of thickness, freedom from internal stresses, and the relative absence of interdiffusion with the substrate, as compared with the coatings of prior art electrodes. The coatings, when sufficiently thick to observe crystal structure, are also characterized by columnar or equiaxed,[1] non-porous crystal structure. The experiment described below and field tests have demonstrated the improved performance of our electrodes compared with prior art electrodes.

---

[1] When the electrodes are produced without heat treatment as described below, the structure is columnar. When produced with a heat treatment, the structure is equiaxed.

Thus, the samples having less than .0001 inch platinum coating thickness (average about .00005 inch) provided high resistance to flaking, even at current intensity of 3000 amperes per square foot. They demonstrate this characteristic even without a post coating heat treatment. A heat treatment is optional.

Heat treated samples of greater than .0001 inch, while not as good as the thinner coated samples, are improved compared to prior art products. The benefit of the heat treatment is that stresses are relieved in these thicker coatings, although the temperature and time of heat treatment are sufficiently low that very little diffusion occurs. In the thinner coatings, the coatings are stress free, as deposited.

The electrodes should be cleaned before vacuum coating to remove oxide. But thorough cleaning is not necessary. It is known that an oxide layer a few angstroms thick is conductive and we have found that the vacuum coatings adhere well to the substrate even though some oxide remains.

In preparing the above samples, the precleaning consisted of vapor honing the substrate and then cleaning it with alcohol. We used a wet fine abrasive (300 grit alundum suspended in water along with a rust inhibiting agent) and sprayed with air pressure of 70–90 p.s.i. The subsequent washing was done in isopropyl alcohol.

The invention may also be applied to other refractory metal such as tungsten, tantalum and columbium substrates. The substrate may also include a base metal with a thick surface layer of the refractory metal. The substrates may be of a variety of forms—such as rod, sheet, expanded metal mesh. The noble metal coating may be gold or any of the platinum group metals—i.e., platinum, rhodium, osmium, iridium, ruthenium, palladium and their alloys.

A unique advantage of our improved electrodes is that the coating is so adherent that even if a small area is exposed the adjacent coated areas will not be undercut by corrosion as in prior art coated electrodes. Thus small areas can be left uncoated without disastrous corrosion and without great loss of efficiency. For instance, if a square foot of coated electrode surface is exposed to the electrolyte, exposure of one square inch of uncoated surface in that area would only decrease the efficiency of the electrode by about 9/10 of 1%. This provides an important capability since accidental exposure or stripping of small areas of an electrode is accommodated. More significant, however, is the point that this capability allows the deliberate use of uncoated areas on the electrode surface. For instance, the manufacturing process might provide for the use of clamps in holding the electrode while coating it with noble metal. In the prior art, it was necessary to (a) keep the area which was under the clamp out of the electrolyte in subsequent usage, (b) use no clamps in manufacturing or (c) overcoat the area which was under the clamp. With our improved product, these constraints are avoided. Another way in which our product affords manufacturing economics is that long rods or large sheets can be vacuum coated and then cut into small electrodes. The exposed ends or edges are uncoated and will rapidly passivate in use. But this is tolerable because oxidation will be confined to these exposed ends or edges.

What is claimed is:

1. An improved electrode, for use in electrochemical processes or systems requiring polarity reversals, comprising a refractory metal substrate with a noble metal coat adhering thereto formed by vacuum depoistion and having chaarcteristic structure of vacuum deposition, a thickness of less than .0001 inch, high degree of uniformity of said coating thickness, essential freedom from internal stress of the as-deposited coating, and essential freedom from diffusion or alloying at the substrate/coating interface whereby the coating adherence is so high that it resists flaking upon exposure to polarity reversal currents of 3000 amperes per square foot in a caustic electrolytic bath and so that it avoids propagation of flaking around bare spots on the electrode which are exposed to the electrolytic bath.

2. The electrode of claim 1 wherein the substrate is titanium and the coating is platinum.

References Cited

UNITED STATES PATENTS

| 3,076,754 | 2/1963 | Evans. |
| 3,117,023 | 1/1964 | Tirrell _____ 117—227 |
| 3,318,792 | 5/1967 | Cotton et al. |

FOREIGN PATENTS

| 877,901 | 9/1961 | Great Britain. |
| 896,963 | 5/1962 | Great Britain. |

OTHER REFERENCES

Platinum Metals Review, vol. 2, No. 2, April 1958, pp. 45–47.

HOWARD S. WILLIAMS, *Primary Examiner.*

D. R. JORDAN, *Assistant Examiner.*